Figure 1:
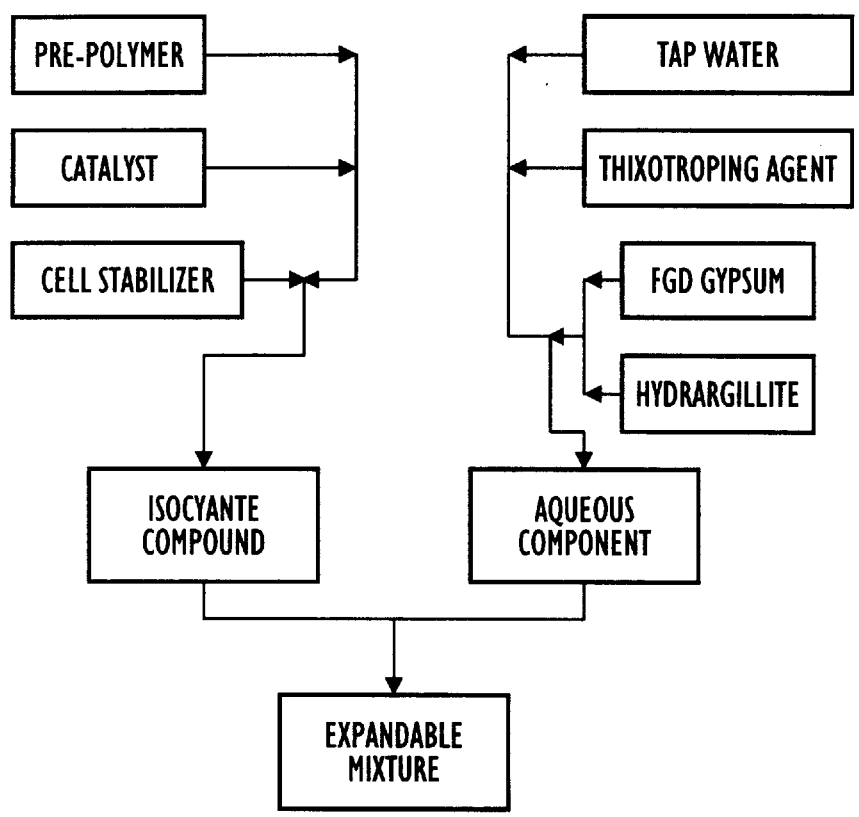

United States Patent
Meinhardt

[11] Patent Number: 5,852,063
[45] Date of Patent: Dec. 22, 1998

[54] PROCESS FOR PREPARING JOINTING FOAM

[75] Inventor: Stefan Meinhardt, Reutlingen, Germany

[73] Assignee: Fraunhofer-Gesellschaft Zur Forderung Der Angewandten Forschung E.V., Stutgart, Germany

[21] Appl. No.: 637,149

[22] PCT Filed: Oct. 19, 1992

[86] PCT No.: PCT/EP92/02393

§ 371 Date: Jun. 16, 1994

§ 102(e) Date: Apr. 14, 1994

[87] PCT Pub. No.: WO93/08142

PCT Pub. Date: Apr. 29, 1993

Related U.S. Application Data

[63] Continuation of Ser. No. 211,774, Jun. 16, 1994, abandoned.

[30] Foreign Application Priority Data

Oct. 18, 1991 [DE] Germany .......................... 41 34 550.9

[51] Int. Cl.⁶ ........................................................ C08J 9/02
[52] U.S. Cl. ............................. 521/83; 521/100; 521/155
[58] Field of Search ............................... 521/83, 100, 155

[56] References Cited

FOREIGN PATENT DOCUMENTS

| 2044168 | 9/1990 | Canada . |
| 39 09 083 | 6/1990 | Germany . |
| 53-145323 | 5/1979 | Japan . |

*Primary Examiner*—John M. Cooney, Jr.
*Attorney, Agent, or Firm*—Sughrue, Mion, Zinn, Macpeak & Seas, PLLC

[57] ABSTRACT

According to a process for preparing joint sealing foam, gypsum hydrate is suspended in water, the water slurry is intimately mixed with diphenylmethane diisocyanate prepolymers and/or toluene diisocyanate, is introduced into the joint and is allowed to set in.

14 Claims, 3 Drawing Sheets

PROCESS FOR PREPARING JOINTING FOAM

This is a Continuation of application Ser. No. 08/211,774 filed Jun. 16, 1994 which is now abandoned.

The invention relates to a process for preparing jointing or in-situ foam. In-situ foam is understood to be a PUR rigid foam, which is produced at the point of application, that is to say on the spot.

In the building and construction industry foams are used to seal joints, e.g. when fitting windows and doors, between the building and the part being fitted. The foams are based on polyurethane and are expanded with Frigen, a fluorinated hydrocarbon. These foams have the advantage of simple application from a spray can and in addition they correspond to the constructional and mechanical requirements of the building industry.

In practice, despite the many advantages of such foams, doubts have been raised recently. These relate in the main to the use of a fluorinated hydrocarbon as propellant, but also to the plastic polyurethane which may produce problems during waste disposal. For this reason, many architects and clients are therefore returning to old, much more time-consuming methods and are again plugging these joints with mineral wool or organic plaits, wherein the efficiency of the measures depend to a larger extent on the care and qualifications of the worker carrying out the job than was the case when using foams.

In the light of the shortly-to-be-expected ban on fluorinated hydrocarbons the development of new, harmless foam products with identical or similar properties is reasonable.

Known systems differentiate between one-component and two-component systems.

One-component systems consist of moisture-hardening pre-polymers. In contrast to two-component systems, they take longer to harden because there is a reaction with atmospheric moisture. Their main area of use is in particular to seal cavities in buildings or to fasten door frames in place.

Two-component systems consist of a polyol and a poly-isocyanate. Production of the foam takes place using easily transportable foaming machines, such as e.g. pressurised containers, by the casting or injection methods.

In both cases the components which are kept under pressure as an expandable mixture are delivered via a valve. A closed or open-celled foam is produced, depending on the blowing method. Intermediate states may also be obtained. Closed-cell foams have extremely low thermal conductivities, but in contrast open-celled foams absorb sound very effectively.

The present invention is based on the object of making available a method for preparing in-situ or jointing foams in which no harmful fluorinated hydrocarbons are used as propellant. The in-situ and jointing foams prepared in an environmentally friendly manner according to the invention are not produced by organic blowing gases, in contrast to conventional methods.

Processing the jointing foam is intended to be capable of taking place in accordance with normal building practice, in small units, in order to be able to fill geometrically complicated joints easily and uniformly in all areas. The method according to the invention is intended to be capable of being performed with multi-component systems by using multi-component spray nozzles or by means of spray-guns or small compressors.

Jointing foam according to the invention is intended for use mainly wherever jointless insulation made from sheets or other moulded items can be produced only unsatisfactorily or not at all. Typical applications are the filling of cavities in a building, e.g. between door frames, in the mining industry for consolidating loose rock and for thermal insulation of domestic appliances, containers and moulded items with complex geometries, also in the petroleum industry. The jointing foams produced according to the invention are also intended to be used for the rapid and relatively simple erection of emergency accommodation. The "igloos" which are prepared should provide good thermal insulation and therefore good protection against the cold, in contrast to tents.

The qualitatively high physical and chemical properties and the price level of in-situ and jointing foams currently on the market are intended to be retained. In particular, the foam prepared according to the invention must satisfy the following demands:

the foam formed and the blowing gas must be physiologically harmless.

the pore structure and surface quality should be adjustable.

the mechanical properties, such as elasticity, breaking strength, thermal conductivity and sound insulation, and fire protection classification, should be retained when compared with conventional foams.

guarantee of simple and problem-free application.

high foam productivity.

the production costs should be no higher than those of conventional systems.

The invention provides a method for preparing an in-situ or jointing foam, which is characterised in that gypsum dihydrate is slurried in water, the water slurry is introduced into the joints intimately mixed with diphenylmethane-4,4'-diisocyanate pre-polymers, diphenylmethane-4,2'-diisocyanate pre-polymers, 2,4-toluylene diisocyanate, 2,6-toluylene diisocyanate or a mixture of these compounds and allowed to harden.

The jointing foam according to the invention may be used wherever a foam of this type has been used in the past. It may be used, for instance, for the jointless insulation of sheets or other moulded items, to fill cavities in buildings, e.g. between door frames, in mines to consolidate loose rock and for the thermal insulation of domestic appliances, containers and moulded items with complex geometries, in the petroleum industry and for the rapid and relatively simple erection of emergency accommodation.

The jointing foams prepared according to the invention are thermal and sound insulators. In particular the mechanical properties such as elasticity, breaking strength, thermal conductivity and sound absorption and the fire protection class are just as good as or sometimes better than conventional foams. The jointing foam prepared according to the invention is free of monomers, i.e. is physiologically harmless, and can be adjusted with respect to pore structure and surface quality in a manner known per se. The process according to the invention can be performed in a simple and problem-free manner. The process according to the invention has a high foam productivity and the cost of preparing the jointing foam is no higher than that of jointing foam which is prepared by known methods.

Any neutral or weakly acid, non-hydraulically hardening modifications of calcium sulphate with the conventional powdery degree of fineness may be used as gypsum in the present invention. Commercially available grades of gypsum with a water/gypsum ratio of 0.3 are preferably used. It is particularly preferable to use FGD gypsum. FGD gypsum arises from flue gas de-sulphurisation plants. FGD gypsums are moist dihydrates which may also, however, be provided as semi-hydrates, depending on the amount.

The gypsum dihydrate, preferably FGD gypsum, is slurried in water. The aqueous slurry is prepared in such a way that 30 to 70 wt. % of dihydrate, preferably 40 to 60 wt. %, and most preferably 45 to 55 wt. % of gypsum dihydrate, is slurried in the corresponding amount of water. The weight percentages are with respect to the aqueous slurry which contains gypsum dihydrate.

According to the invention, the water slurry of gypsum dihydrate is mixed with diphenylmethane-4,4'-diisocyanate pre-polymers, diphenylmethane-4,2'-diisocyanate pre-polymers, 2,4-toluylene diisocyanate, 2,6-toluylene diisocyanate or a mixture of these compounds. The mixture may contain any components from among the individual compounds. There are no restrictions at all in this respect. The pre-polymers mentioned have the special advantage of being solvent-free, of offering a constant NCO content as pre-polymers and of having an amount of monomer of less than 0.5 wt. %. Diphenylmethane-4,4'-diisocyanate pre-polymers and diphenylmethane-4,2'-diisocyanate pre-polymers are preferred. A diphenylmethane-4,4'-diisocyanate pre-polymer or diphenylmethane-4,2'-diisocyanate pre-polymer which has an NCO content in the range 12 to 20 wt. %, particularly preferably 14 to 18 wt. %, and most preferably 16 wt. %, is ideally used. Such products are commercially available. The products have a viscosity of 10,000±2,000 mPa.s at 20° C. Furthermore, a 2,4-toluylene diisocyanate or 2,6-toluylene diisocyanate with an NCO content in the range 2 to 20 wt. % is preferably used. Such pre-polymers are sold by Bayer and are obtainable commercially under the trade names of, for example, Desmodur E 14 with an NCO content of 3.5 wt. % and an equivalent weight of 1200 or Desmodur E 22 with an NCO content of 8 wt. % and an equivalent weight of 525.

During the process according to the invention, diisocyanate pre-polymers react with the water which is used to slurry the gypsum and the water of crystallisation in a manner known per se to form a carbamic acid derivative which is converted into a primary amine with the evolution of carbon dioxide. The primary amine reacts with the isocyanate to give an urea derivative or ureide which may optionally react further. In the present application the expression "polyurea" is intended to include the condensation product produced from diphenylmethane-4,4'-or diphenylmethane-4,2' diisocyanate pre-polymers and water.

During the process according to the invention, 40 to 60 wt. % of aqueous slurry, preferably 45 to 55 wt. % of aqueous slurry and most preferably 50 wt. % of aqueous slurry and 60 to 40 wt. % of pre-polymers, preferably 55 to 45 wt. % of pre-polymers and most preferably 50 wt. % of pre-polymers or a mixture of pre-polymers is introduced into the joint, wherein the weight percentages are with respect to the total mixture.

According to the invention, a wetting agent, a catalyst or a foam stabiliser or a mixture of at least two of these compounds may be added to the aqueous slurry or the pre-polymers or mixture of pre-polymers. These compounds are added in amounts of up to 5 parts by weight, with reference of 100 parts by weight, to the mixture of aqueous slurry and pre-polymers.

The catalyst causes rapid setting of the expanded material at the surface. The cell stabiliser enables adjustment of the cell size and the wetting agent enables a high degree of filler packing, i.e. a high input of gypsum. The jointing foam may contain other conventional additives in conventional amounts, for example in an amount of 0.1 to 2 wt. %, with respect to the dry weight of gypsum and polyurea.

In the process according to the invention, triethylamine, dibutyltin dilaurate or dioctyltin dilaurate, for example, is used as a catalyst. Basically, any catalyst which is known in this field may be used.

Silicone stabilisers are preferably used as cell stabilisers. These are commercially available and there is a large selection.

Wetting agents known per se, i.e. commercial products such as fatty alcohol sulphonates, quaternary ammonium compounds and also other cationic, non-ionic and anionic agents may be used as a wetting agent according to the invention. Specific examples of wetting agents are ethylene oxide/propylene oxide/polyglycol, a betain-siloxane surfactant, a lower acrylic copolymer and an alkylphenol ethoxylate, such as LUTENSOL® commerically available from BASF. This is preferred. The wetting agents have an effect on complete curing and the degree of elasticity. They are used in amounts known per se, for example 0.1 to 2 parts by weight, preferably in amounts of 0.5 to 1.0 parts by weight, particularly preferably in an amount of 0.5 parts by weight, with reference to 100 parts by weight, as a mixture of aqueous slurry and diisocyanate pre-polymers. They are used to control the pore size. The higher the proportion of wetting agent, the smaller the pores.

To control the isocyanate/water reaction, in principle the same kind of catalysts are used as are known from the formation of PUR. Here again, organo-tin compounds are included among the most effective catalysts. When using organo-tin compounds, foam formation may take place within 30 seconds.

Special surface-active compounds are used to control the cell-wall thickness and the cell size. They have an effect on the surface tension at the micelle walls being produced and, in the most unfavourable case, prevent collapse of the foam. Special silicone surfactants or else cellulose derivatives are suitable for use here. Cellulose derivatives enable simultaneous adjustment of the viscosity of the aqueous component to a high value. This is required in order to prevent the reactive mixture already applied flowing under the force of gravity, e.g. between door frames or window frames and brickwork.

Excellent results are obtained by the use of specific montmorillonite modifier products which act as thickeners in an aqueous phase and which are commercially available as bentones. Bentone EW, for instance, in addition to increasing the viscosity of the aqueous phase also increases adhesion of the material to the existing substrates such as walls, wood, bricks etc. Bentone EW, for instance, is highly purified magnesium montomorillonite, s.g. 2.4. Bentone EWs are sold by Titangesellschaft, Leverkusen.

The inflammability of foam according to the invention is decreased by the incorporation of FGD gypsum because it loses water of crystallisation at temperatures above 120°–130° C. An additional flame-retarding system may be added to further improve the fire behaviour. In contrast to conventional halo-organic flame retardant systems, hydrargillite, i.e. an aluminium hydroxide, may be used according to the invention. This provides physiologically harmless flame-proofing. The price of hydrargillite is comparatively low. Hydrargillite reacts to give aluminium oxide and water via several intermediate steps when heated. The reaction is strongly endothermic. The water which is formed also acts as a flame retardant. According to the invention, the flame retarding substance hydrargillite is preferably added to the aqueous slurry. In order to give the product the highest fire-proofing properties, magnesium oxide, zinc borate or a mixture of these may be added in addition to hydrargillite, i.e. aluminium hydroxide. The use of this substitute substance depends on the intended final purpose. According to the invention, up to 50% of the gypsum hydrate may be replaced by this type of substitute substance. Preferably up to 30 wt. % of the gypsum hydrate and particularly preferably up to 10 wt. % of the gypsum hydrate is replaced by a substitute substance.

In accordance with a further preferred embodiment according to the invention, the aqueous gypsum/hydrargillite component is adjusted to be thixotropic by the use of special cellulose derivatives. The viscosities set in this way prevent the expandable mixture flowing in a vertical direction.

For simple do-it-yourself use, the aqueous and isocyanate phases were packed in a special two-component cartridge. By means of a static mixer, the components can be fully mixed using a cartridge-gun under pressure and applied as an expandable mixture.

In the process according to the invention, the following individual components, for instance, may be used:

Individual components

Polyisocyanate: pre-polymer based on 4,4' MDI, 4,2' MDI and special polyols with a free isocyanate content of 16% and a viscosity of at least 10,000 mPas (obtainable from Bayer AG, Leverkusen as Desmodur E 21).

Pre-polymers: based on 2,4 TDI or 2,6 TDI (obtainable from Bayer AG under the names Desmodur E 14 with an NCO content of 3.5 wt. % and an equivalent weight of 1200 and Desmodur E 22 with an NCO content of 8 wt. % and an equivalent weight of 525).

Fillers: screened FGD gypsum with a particle size of at least 50 μm (obtainable from Ruhrkohle AG, Essen). hydrargillite (obtainable from Martinswerk GmbH, 5010 Bergheim, Martinal)

Aqueous phase: tap water
methyl cellulose or hydroxyethyl cellulose (Walocel MT 40000 PV obtainable from Wolff Walsrode AG, 3030 Walsrode; Natrosol 250 high from Aqualon GmbH, 4000 Düsseldorf).

Additives: Catalyst based on dibutyltin dilaurate (obtainable from Merck AG, Darmstadt).
Cell stabilisers based on special silicone surfactants (obtainable from Goldschmidt AG, Chemische Fabriken, 4300 Essen 1).

Two-component system

Isocyanate component: The pre-polymers are initially introduced and ca. 0.1% of dibutyltin dilaurate and ca. 0.5% silicone surfactant are added. The system is mixed to make it homogeneous.

Aqueous component: A highly viscous, thixotropic suspension with a solids content of at least 66% is produced from a hydrargillite/FGD gypsum mixture. The thixotropy is adjusted using methyl cellulose or hydroxyethyl cellulose, which is added to the tap water at a rate of 1–3%. Bentone EW in amounts up to 15 wt. % may also be used to adjust the thixotropy.

Expandable mixture

An optimal foam is obtained by mixing one part by volume of isocyanate component and one part by volume of aqueous component. The foam is produced immediately after combining the two components.

Preparation of the two components and production of the expandable mixture is shown by way of example in the enclosed FIG. 1.

The process according to the invention may also be performed on a small scale. The components may, for instance, be sold in 0.5 or 1 l containers, for example in builders merchants. The process may also become available in the do-it-yourself sector. For example, the aqueous slurry and the isocyanate component may be packed in a two-component cartridge. The chambers should each have the same volume. Their bases are moveable but are impermeable to the surroundings. Using a mechanically pressurised gun, both components are simultaneously ejected from the cartridge and are fully mixed in a static mixer.

Figure 2:
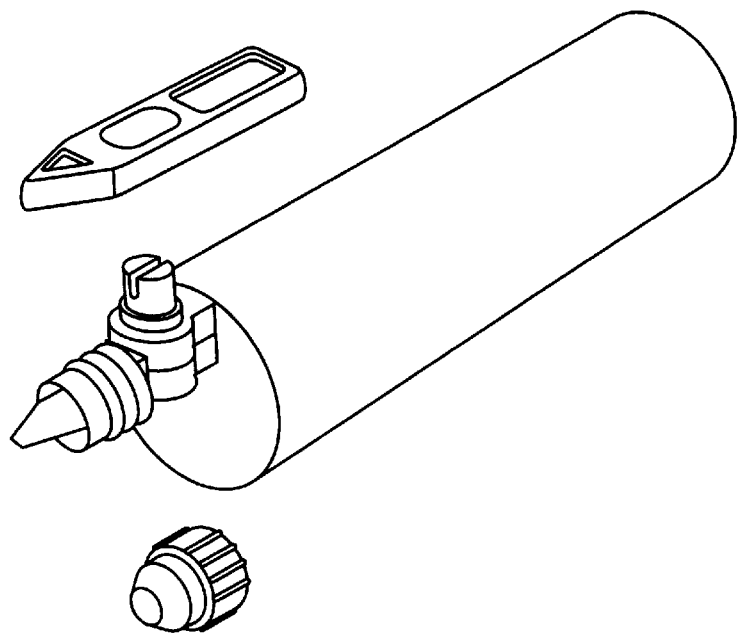
Figure 3:
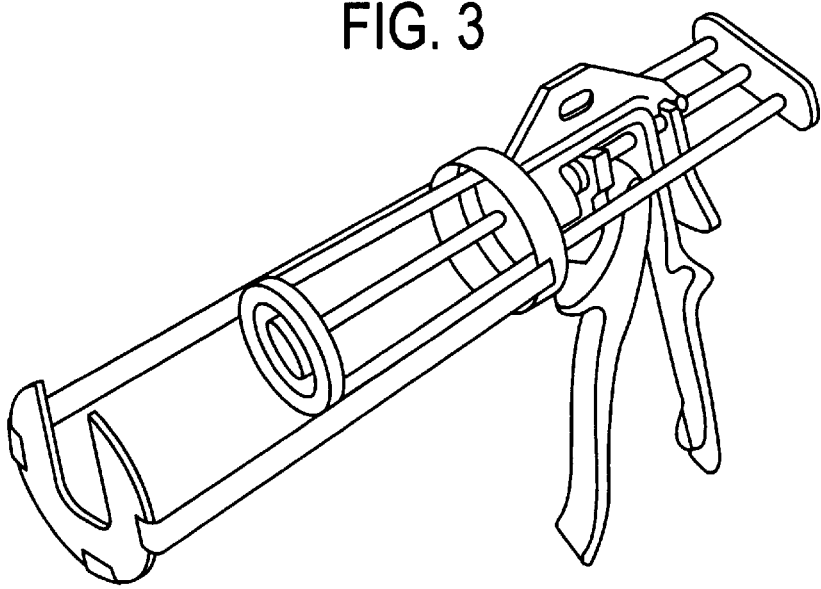
Figure 4:
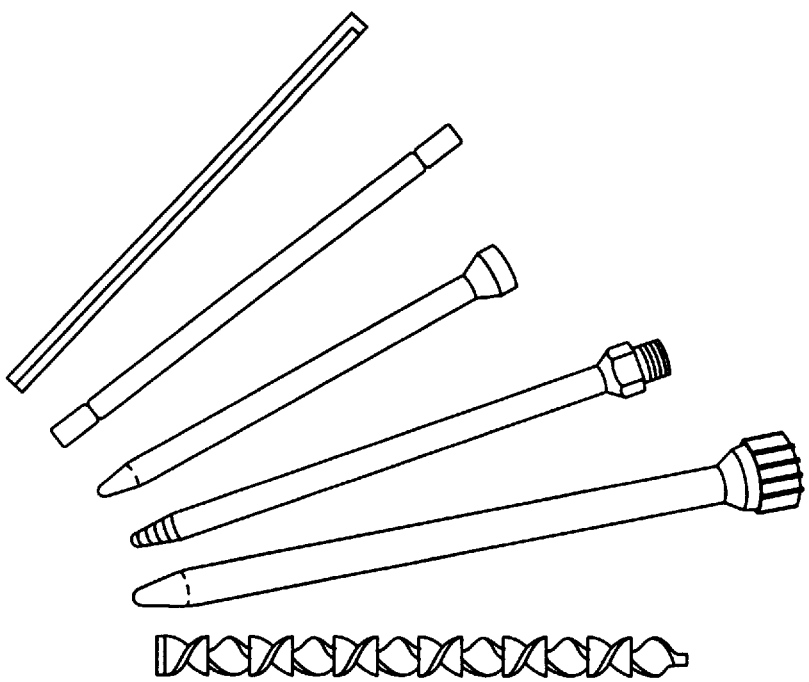

Suitable cartridges with the appropriate mechanical pressure-guns and a suitable static mixer are shown as examples in enclosed FIGS. 2, 3 and 4.

To process larger amounts, a two-chamber container with moveable pistons which are regulated, e.g. pneumatically, is suitable. An appropriate static mixer is again used to mix the components.

The foams have bulk densities of ca. 50 g/l on average and are relatively elastic. They have a high power of adhesion to brickwork. Their thermal conductivity is very small. The λ value is 0.04.

The physical suitability tests, such as permeability to moisture, thermal conductivity, breaking strength and abrasion resistance correspond to the criteria required for the applications mentioned.

The foam achieves its final strength after one hour and can be cut without any problems. The structure of the foam is resistant to hydrolysis and resistant to dilute acids and alkalis. Incorporation of FGD gypsum and hydrargillite lead to flame retardant reactions due to the release of water. Fire protection class B2 is complied with.

The in-situ and jointing foam developed was expanded between bricks, wood and bricks and wood and cardboard. It may be introduced between substrates which are normally used in the building industry. In all cases, the power of adhesion to the material surfaces was greater than the cohesive strength of the foam joint. The foam can be mechanically worked after hardening without causing problems. It can be precisely cut or sawn.

Incorporation of aluminium hydroxide led to a marked improvement in fire behaviour during inflammability tests. Modification of the aluminium hydroxide and the associated release of water, which is also produced simultaneously in large amounts from the FGD gypsum which is also present, inhibits direct attack by flames. Fire protection class B2 according to DIN 4102 is complied with.

The following examples explain the invention in more detail

EXAMPLE 1

99.4 parts by weight of Desmodur E 21 pre-polymer based on 4,4' MDI and 4,2' MDI and special polyols with a free isocyanate content of 16% and a viscosity of at least 10,000 mPas, obtainable from Bayer AG, Leverkusen, were well mixed with 0.1 parts by weight of dibutyltin dilaurate and 0.5 parts by weight of silicone foam regulator. Separately, 56.0 parts by weight of FGD gypsum as the dihydrate, 10.0 parts by weight of Al(OH)$_3$ and 34.0 parts by weight of 2% strength methyl cellulose in H$_2$O were mixed together. The two mixtures were placed in a cartridge in a ratio of 1:1 and used to expand into a joint.

EXAMPLE 2 the same procedure is used as described in example 1. The following components are prepared:
80 parts of FGD gypsum
20 parts of hydrargillite 0.5 parts of silicone surfactant (TEGO 5852)

1 part of bentone EW 32 parts of water.

$\overline{133.5}$ parts of aqueous component 100 parts of aqueous component were mixed with 68 parts of Desmodur E 21 (+Zn-dibutyl dilaurate).

EXAMPLE 3

The same procedure as described in example 1 is used and the following components are prepared:

80 parts of FGD gypsum 20 parts of hydrargillite 2 parts of bentone 0.5 parts of silicone surfactant (TEGO 5852)

40 parts of 2.0% strength methylhydroxyethyl cellulose in water (e.g. Walscell MW 40,000 PFV, Walsrode)

$\overline{142.5}$ parts of aqueous component 100 parts of aqueous component are mixed with 65 parts of Desmodur E. 21.

EXAMPLE 4

Part A

57 FGD gypsum 15 hydrargillite 0.4 silicone surfactant

2 Bentone EW 25.6 $H_2O$ $\overline{100.0}$

Part B

Desmodur E 14

Parts A and B were mixed in the ratio of 1:1.

EXAMPLE 5

The same procedure as described in example 1 is used. Parts A and B described in example 4 are prepared. Parts A and B are mixed in the ratio of 1:1.5.

I claim:

1. A process for forming an in situ jointing foam wherein two components A and B for forming the jointing foam are intimately mixed at the time of application to a joint comprising storing in a first compartment of a 2-compartment cartridge container as a first component A a thixotropic slurry containing 30 to 70 wt. % of gypsum dihydrate and 70 to 30 wt. % of water; and storing in a second compartment of the 2-compartment cartridge container as a second component B diphenylmethane-4,4'-diisocyanate pre-polymer, diphenylmethane-4,2'diisocyanate pre-polymer, 2,4-toluylene diisocyanate, 2,6-toluylene diisocyanate, or a mixture thereof; intimately mixing at the time of application to a joint 40 to 60 wt. % of the component A aqueous slurry of said first compartment with 60 to 40 wt. % of the component B of said second compartment wherein the weight percentages are with reference to total mixture; and introducing the intimate mixture into a joint and allowing the mixture to harden.

2. A process according to claim 1, characterised in that a wetting agent, a catalyst or a foam stabiliser or a mixture of at least two of these compounds is added to either the aqueous slurry or the pre-polymers or mixture of pre-polymers.

3. A process according to claim 1, characterised in that the aqueous slurry and the pre-polymers or the mixture of pre-polymers, which optionally contain catalyst, foam stabiliser and/or wetting agent, have the same viscosity or that their viscosities do not differ appreciably.

4. A process according to claim 1, characterised in that a diphenylmethane-4,4' or diphenylmethane-4,2'-diisocyanate pre-polymer with an NCO content in the range of 12 to 20 wt. % or a 2,4-toluylene diisocyanate or 2,6-toluylene diisocyanate with an NCO content in the range of 2 to 20 wt. % is used.

5. A process according to claim 1, characterised in that triethylamine, dibutytin dilaurate, or dioctyltin dilaurate is used as a catalyst, a silicone stabiliser is used as a stabiliser and an alkylphenol ethoxylate, is used as a wetting agent.

6. A process according to claim 1, characterised in that some of the gypsum dihydrate used is replaced by aluminium hydroxide, magnesium hydroxide, zinc borate or mixtures thereof.

7. A process according to claim 6, characterised in that up to 50 wt. % of the gypsum dihydrate is replaced by aluminium hydroxide, magnesium hydroxide, zinc borate or mixtures thereof.

8. A process according to claim 1, characterised in that mixing the aqueous slurry and the pre-polymers takes place by means of multi-component equipment.

9. A process according to claim 8, characterised in that a spray nozzle or an injection gun is used as the multi-component equipment.

10. A process according to claim 1, characterised in that curing of the foam takes place at room temperature and at atmospheric pressure.

11. The process of claim 1, wherein component A and component B are stored in separate compartments of a 2-compartment cartridge prior to forming the jointing foam.

12. The process of claim 1 wherein component A has a solids content of at least 66%.

13. The process of claim 1 wherein component A contains 1 to 3% methylcellulose or hydroxyethyl cellulose.

14. The process of claim 1 wherein component A contains bentone.

* * * * *